Figure 1:
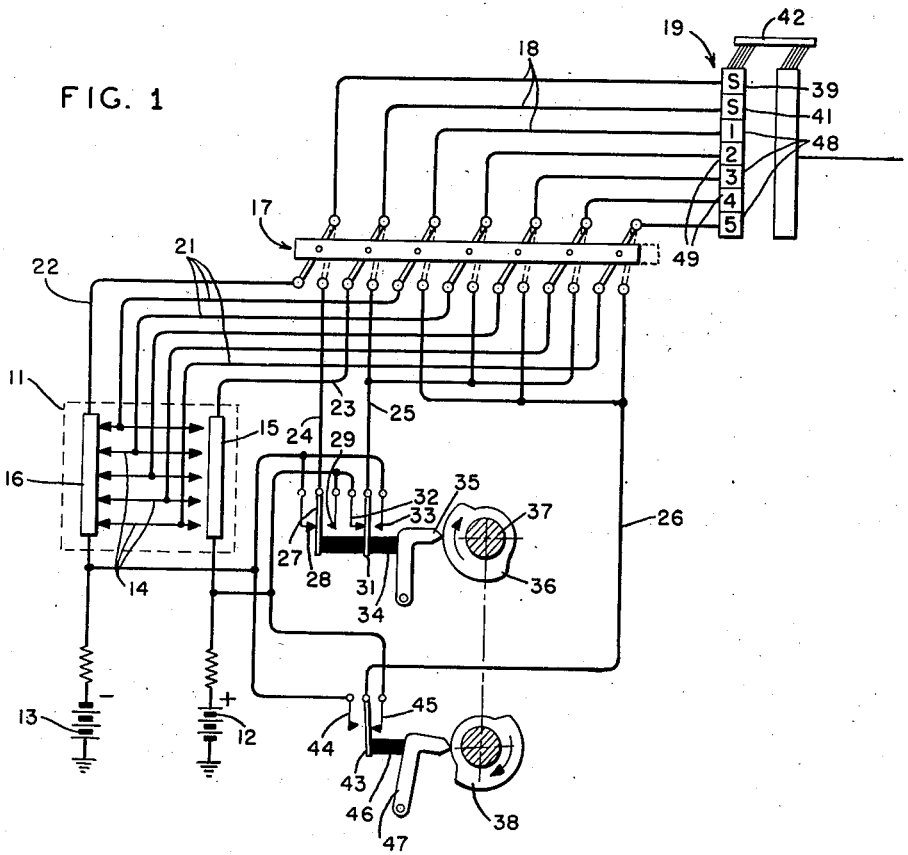

July 11, 1944.  L. M. POTTS  2,353,584

TEST SIGNAL TRANSMITTER

Filed Dec. 26, 1941

INVENTOR.
LOUIS M. POTTS

BY H. B. Whitfield
ATTORNEY.

Patented July 11, 1944

2,353,584

UNITED STATES PATENT OFFICE 2,353,584

TEST SIGNAL TRANSMITTER

Louis M. Potts, Evanston, Ill., assignor to Teletype Corporation, Chicago, Ill., a corporation of Delaware Application December 26, 1941, Serial No. 424,551

14 Claims. (Cl. 178—69)

The present invention relates to signal transmitting apparatus and more particularly to test impulse generators operatively associated with a tape sensing mechanism to produce successively a series of test impulses under normal transmitting conditions.

Signal distortion factors influence telegraph lines variously so that message signals sent thereover are distorted to a greater or less degree making the reception of messages uncertain and likely to cause printing errors on account of the numerous ways in which a distorted signal may vary from the true or theoretically perfect multiple-impulse signals of the Baudot permutation code type. A method frequently used for testing the susceptibility of telegraph lines to interference which might cause signal distortion is the sending thereover of test signals and the subsequent visual reproduction of such signals together with the effects of the line factor distortions. These distortions in contradistinction from those arising out of transmitter apparatus origin are sometimes referred to as fortuitous distortions since they may occur spasmodically and variantly. Visual indexes of these current impulses are produced in order to be able to see their pattern after having been modified in accordance with the various factors of signal distortion which might cause them to be rounded, elongated, or otherwise changed in appearance from the theoretically perfect signal pattern which may also be visually interpreted upon an oscillograph or other recording instrument as a square top or block signal.

In addition to the fortuitous distortion influences inherent in a line, certain factors of distortion may be imparted by maladjustments in the transmitting station equipment such as relays, contacts, and mechanical moving parts. The susceptibility of a given telegraph line as well as that of the transmitting station apparatus to these various causes of interference may be read in terms of the pattern changes from theoretically perfect signals upon an oscillograph and in consequence there may be determined the necessary corrections or adjustments in a receiving station apparatus so that there may be diminished the possibility of printing error.

Several types of apparatus have been employed for the purpose of generating continuous square top A. C. wave current reversals such as reversing switches, rotary transmitting distributors with segments alternately connected to opposite line condition, and signal transmitters utilizing previously prepared current variation in the form of a predetermined perforated tape. In each of these instances excepting those cases where the transmitting apparatus is itself utilized as a test device, signal distortion observations will yield information concerning the line distortion factors solely, but will not include certain other possible signal distorting influences local to the transmitting equipment. Where conventional transmitters are provided with previously prepared code-perforated tape for the purpose of generating test signals of alternate impulses, the tape preparation is deemed comparatively wasteful and the practice of perforating a supervisory control form is itself susceptible to human error during the process of preparation. It is accordingly desirable to be able to utilize the essential elements of a transmitting station apparatus for the purpose of generating alternate impulse test signals without having to use perforated tape in its operation. Toward this end there is proposed herewith an auxiliary device that may be operated together with a regular transmitting apparatus so that the resulting signal pattern, when visually reproduced at a receiving station, may reveal both fortuitous distortion of the transmission line factors as well as internal distortion factors inherent in the transmitting equipment. Compensating corrections may then be made at the receiving station apparatus with full regard to all of the factors which contribute towards the distortion of line communication signals.

Customary signal transmission utilizes five-unit codes with which there are provided start impulses of spacing polarity and stop impulses of marking polarity. The five impulses constituting each permutation code may be comprised of any combination of marking and spacing impulses. In attempting to effect a continuous alternation of impulses throughout the seven components of the signal, it will be noted that if the first permutation code impulse is made to differ from the start impulse, then the fifth permutation impulse will necessarily be of the same potential as its adjacent stop impulse. Again, if the fifth permutation code impulse is made to contrast from the stop impulse, then the first must necessarily be the same as the start impulse. This condition obtains because the permutation code is comprised of an odd number of constituent impulses. But practice has standardized the five-unit code and in order to attain continuously alternating impulse conditions without encountering this difficulty of coincidence between any two adjacent impulses, it is herewith proposed to utilize apparatus which will produce a succession of variable conditions, impulse for impulse, forming a continuous undulated wave suitable to the purpose of test signaling.

The principal object of the present invention, therefore, is the provision of a signal generating apparatus that may be associated with telegraph transmitter unit so as to reproduce a succession of alternating current square-top impulses having the distortion characteristics of the transmitting apparatus and contacts as well as those of the transmission line.

Figure 2:
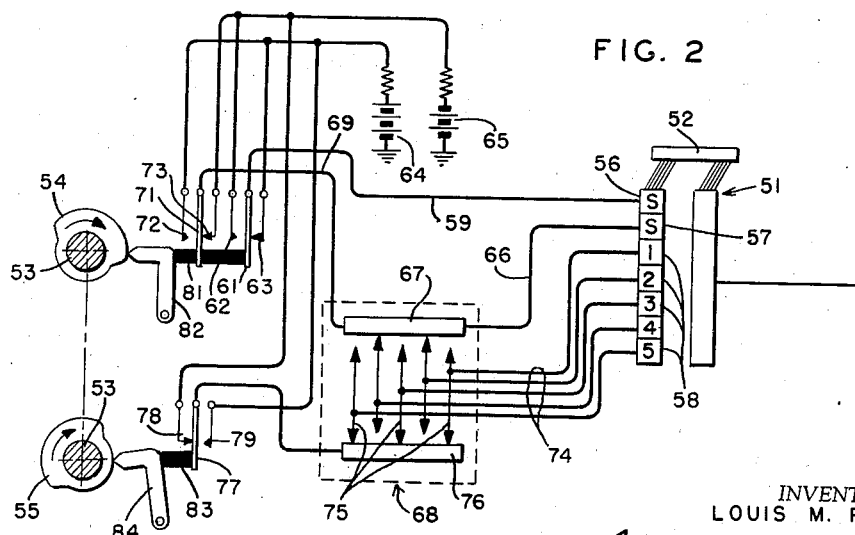

For a more comprehensive understanding of this invention reference may be had to the accompanying drawing and to the following detailed specification wherein like reference characters indicate corresponding parts throughout and wherein, Fig. 1 is a schematic circuit illustration of a principal embodiment of the present invention, and Fig. 2 is a modified schematic circuit illustration featuring another application of the present invention.

Referring now more particularly to the illustrations on the accompanying drawing attention is directed to the dotted rectangle 11, Fig. 1, by which is denoted conventionally a transmitting station apparatus for issuing permutation code telegraph signals of the start-stop five unit variety. For convenient reference to a disclosure of this type of unit attention is directed to the Teletype Corporation's Bulletin No. 141 entitled "Description and Adjustments Transmitter Distributor" published November, 1940. In accordance with standard practice, permutation code signals may be comprised of marking and spacing impulses having current and no-current or plus and minus potentials, respectively. By way of illustration, the disclosures herein are featured with plus and minus batteries as at 12 and 13. The double acting contactors usually provided with the tape sensing feeler levers are indicated 14 and are shown to be alternatively communicable with the common contact blocks 15 for positive current and 16 for negative current. Obviously, one of the potentials may be eliminated with the result of providing a system for producing a current and no-current undulation.

A master control switch 17 operates a bank of channel switches which route the channel lines 18 of a start-stop transmitting distributor commutator ring 19 alternatively with the lines 21, 22, and 23 of the transmitter unit 11 or with the collector circuits 24, 25, and 26 of the apparatus featured in the preferred embodiment of the present invenion in which the current reversals are directed from batteries through the transmitting commutator and without the inclusion of the tape sensing contactors.

Of the last described circuits, line 24 is connected through a contactor 27 double acting between a pair of contacts 28 and 29 the former of which connects with minus battery 13 and the latter with plus battery 12. Line 25 connects to a contactor 31 which is shiftable to engage a left-hand contact point 32 associated with plus battery 12 or right-hand contactor 33 associated with minus battery 13. The two contactors 27 and 31 are integrated so as to function in unison by means of a mutual insulation block 34 which is acted upon by a thrust arm 35 whose follower projection is spring urged (not shown) to pursue the periphery of a control cam 36.

A start-stop control shaft 37 upon which is carried the control cam 36 as well as another control cam 38 may be driven associatively with the brushes of commutator distributor 19 but at one-half the rate of speed thereof. Since the left-hand contacts 28 and 32 connect with batteries 13 and 12, respectively, it will be noted that during the encounter of the apex of cam 36 with follower arm 35, minus and plus batteries will be placed upon the commutator stop and start segments 39 and 41, respectively, while during the engagement of the low portion of cam 36 with said follower arm 35 a reverse condition of the contactors 27 and 31 will place plus battery 12 and minus battery 13 on said segments 39 and 41, respectively.

The phase relationship between control cams 36 and the brush carrier 42 of commutator 19 is such that the transfer of the contactors 27 and 31 from their left-hand contacts to their right-hand contacts will be executed at a suitable time other than when the brushes of carrier 42 engage segments 39 and 41. Thus, there is assured the proper control over the dimensions of the impulses by the commutator segments rather than risking the possibility of impulse clipping or interference by the auxiliary current reversing apparatus. Correspondingly contactor 43 acting between left-hand contact 44 which connects with minus battery 13 and right-hand contact 45 which connects with plus battery 12 is controlled through its insulation block 46 by an arm 47 that follows the periphery of control cam 38. The phase relationship between cam 38 and distributor brush 42 is such that the transfer of contactor 43 from its left to its right-hand contacts and vice versa will be executed at a time other than when brush carrier 42 traverses the segments 48 of commutator 19. Opposite polarity is placed upon the segments 49 of commutator 19 and for the purpose of assuring that the fundamental shape of the curve representation of the signal alternation may conform strictly with the characteristics of the segmented distributor ring of commutator 19 and not be influenced by the characteristics of the contact shifting operation, contactor 31 is operated at a time other than when carrier 42 is traversing these segments.

In the performance of test signal transmission, the master switch controller 17 is shifted rightwardly as viewed in Fig. 1, so that it will assume a position designated in dotted outline. This places the control of the transmitting distributor 19 under the cams 36 and 38 at the same time removing from supervision the record reader 11. During the half of the cycle when the apex of cam 36 moves contactors 27 and 31 leftwardly, low portion of cam 38 will permit contactor 43 to move rightwardly. This will place positive current upon segment 48 by reason of control circuit 26, and positive on segments 41 and 49 while cam 38 places positive on segments 48. Before brush 42 encounters the #1 segment 48, however, the apex of cam 38 will have reversed the position of its contactor 43 causing negative to be placed upon the segments 48, effecting a throughout alternation between positive and negative, as the brush 42 crosses the several segments of the distributor 19.

As the brush leaves the #5 segment 48 during the half cycle of shaft 37, when said segment is conditioned negatively, follower 35 rides off the apex of cam 36 reversing the condition of its contactors 27 and 31 causing positive through contact point 29 to be placed on segment 39. Thereafter, the alternation between positive and negative potential will be carried out but in a reverse order from the previous cycle with the several segments 41 and 49 being in this case conditioned negatively while segments 48 are conditioned positively. Thus, it will be seen that the supervision of cams 36 and 38 serves to place positive and negative current potential upon the several segments of the distributor ring 19 diffently in consecutive cycles thereby overcoming the inherent obstacle of an odd number of segments as described above and instead effecting a throughout reversal, impulse for impulse, with no two impulses in consecutive order having the same current potential.

It is to be noted also that Fig. 1 accordingly discloses an embodiment in which no perforated control form is utilized in the transmission of test signals. The formation of the signals is a purely mechanical supervision obviating the possibility of human error such as might enter during the preparation of a perforated control form and, above all, utilizing the line relays and transmitting elements of the apparatus from a point beyond the tape senser 11 just as in normal transmission. This affords a means for recognizing the internal distortion factors of the transmission apparatus along with the fortuitous distortion factors of a signaling line.

*Modification*

In Fig. 2 there is illustrated another application of an auxiliary timing mechanism adapted to be utilized in conjunction with a conventional start-stop permutation code transmitter. In the modified embodiment now to be described, the current reversing apparatus is made to operate through the signal sensing contact as well as through the commutator with the result that there may then be obtained a signal pattern reproduction based upon an original exact wave as shaped by the commutator segments but including also such modifications and distortion as are characteristic of the tape sensing contact apparatus. In this application of the proposed improvement a tape loop may be prepared in advance consisting of an endless web of control tape having perforated therein a succession of similar code combination signals that are suitable for making distortion observations such as the standard signals for the letters r or y in which consecutive code impulses are of opposite nature.

In Fig. 2, 51 indicates generally a commutator having a start-stop controlled brush carrier 52 associatively driven with but at twice the cyclic rate of speed as a shaft 53 which carries the two control cams 54 and 55. The segmented ring of the distributor or commutator comprises a stop segment 56 and start segment 57 and a set of five code combination segments generally designated 58.

The stop segment 56 is connected over a line 59 with a contactor 61 which is flexible between two opposite contact points 62 and 63 that connect with plus and minus batteries 64 and 65, respectively. The start segment 57 is connected over a line 66 with the contact junction block 67 of a tape sensing unit generally designated by the dotted rectangle 68. The block 67 is in turn electrically connected over a line 69 with a contactor 71 that is flexible between a left contact point 72 and a right contact point 73 communicating wtih plus and minus batteries 64 and 65, respectively.

The five code combination segments 58 of distributor 51 are connected over a cable 74 to the five shiftable contactors generally indicated 75 that are reciprocated in accordance with the tape sensing levers of the unit 68. The contact block 76 opposite to the afore-mentioned contact block 67 of tape sensing unit 68 is connected to a contactor 77 which is flexible between a left contact point 78 and a right contact point 79 connecting with minus and plus batteries 65 and 64, respectively.

Contactors 61 and 71 are integrally associated so as to be operable in unison by a mutual insulation piece 81 which is adapted to be acted upon by a follower arm 82 spring urged to pursue the periphery of control cam 54 while contactor 77 with which is associated an insulation piece 83 is acted upon by the follower arm 84 which is spring urged to pursue the periphery of control cam 55. By the described circuit arrangement distributor segments 56 and 57 are reversed in polarity as their associated contactors 71 and 61 are flexed to the left or to the right by the supervisory cam 54 while the tape sensing unit contact blocks 67 and 76 are reversed in polarity in accordance with the flexure of contactors 71 and 77, contactor 71 affecting both the characteristics of the permutation code segments 58 as well as the characteristics of the start segment 57 since through it is controled the nature of block 67 as well as that of segment 57.

The timing arrangement of control cams 54 and 55, that is, the periods when their respective apices engage followers 82 and 84 and shift contactors 71, 61 and 77 rightwardly or permit them to return leftwardly, is regulated so as to cause the changing of current characteristics for the segmented ring of distributor 51 at a time other than when distributor brush 52 is traversing the particular segments. In this way there is prevented any distortion or influencing of the signal impulses due to the effects of the cams 54 and 55, but permitting the formation of current reversals to effect the test signal pattern as above described, modified only by the distortion elements or influences of the distributor 51, by the tape sensing apparatus 68 and its contacts, and by the factors of the signaling line.

In the operation of the preferred embodiment, Fig. 1, it is not necessary for the tape sensing apparatus to function during the generation of test signal impulses of the alternating current variety, they being generated by the operation of the control cams 36 and 38 together with the distributor commutator. In the embodiment featured in Fig. 2, the formation of the signal pattern or permutation originates with the tape sensing equipment 68 and it is accordingly required that there be prepared in advance a tape having a succession of signals preferably of the nature partaking of the conventional r or y signals which, as is well known consist of code combination patterns with consecutive impulses of opposite electrical nature. The apparatus provided as an auxiliary to the transmitter in accordance with the present invention, Fig. 2, functions to effect the reversing of the polarity applied to the signal transmitter contact blocks, but the formation of the signal pattern itself depends upon an advance preparation of perforated tape partaking of the proper signal pattern characteristics.

While the present invention has been explained and described with reference to particular illustrations, it is to be understood nevertheless that certain modifications and variations may be instituted without departing from the essential spirit or scope thereof. Accordingly, it is not intended to be limited by the detailed illustrations in the accompanying drawing nor by the specific language in the foregoing specification except as indicted in the hereunto annexed claims.

What is claimed is:

1. In a telegraph transmission system, a tape transmitting apparatus comprising a rotary member having a plurality of impulse forming elements, a tape sensing apparatus including members for probing the presence or absence of perforations in a control tape for determining the alternative electrical nature of impulses to be formed by said elements, and a reversing apparatus antecedent to said tape sensing mechanism for determining the current characteristic of said impulses.

2. In a tape transmitting system, a rotary member having a plurality of elements for forming a series of impulses which comprise isochronous code signals, a tape sensing apparatus including members for determining the presence or absence of perforations in predetermined code signal areas of a control tape, and an apparatus for controlling said tape sensing apparatus and for thereby establishing the current characteristics of said impulses.

3. In combination, a rotary signal transmitting distributor having a segmented ring whose segments correspond in number to the impulses of a permutation code, a tape sensing apparatus for determining the impulse characteristics of permutation code signals, and a reversing switch for invariably communicating current impulses of opposite polarity to consecutive segments of said transmitting distributor.

4. In a tape transmitting apparatus, a commutator having a predetermined number of component impulse elements each related to an impulse of a code, a plurality of routing switches, and cam controlled means for connecting said routing switches between sources of predetermined current polarity and said commutator elements to produce a succession of current reversals continuously throughout successive signal impulses.

5. In a transmitting apparatus, a transmitting commutator having a predetermined number of segments, a plurality of routing switches, and cam controlled means for actuating said routing switches for connecting between sources of predetermined current polarity and said commutator elements to produce continuously a succession of current reversals impulse for impulse.

6. Apparatus for generating current reversals for use in producing testing signal patterns comprising in combination, a rotary transmitting distributor including a plurality of signal impulse elements and distributor brushes, and means for reversing circuit connections between a pair of opposite current sources and ones of said elements, said means comprising cam actuated switching apparatus for reversing the application of said current sources with alternative ones of said impulse elements during instants when said impulse elements are not traversed by said distributor brushes.

7. Transmitting station apparatus comprising in combination, a rotary transmitting distributor having a segmented ring of an odd number of signal impulse segments, a tape sensing apparatus having a plurality of feeler levers each responsive to the perforations in a tape for controlling the application of alternative current potentials to the segments of said ring, and rotary cam means operated in predetermined relationship to said rotary transmitting distributor for connecting different current potentials to said contactors during consecutive cycles of transmission.

8. Transmitting station apparatus comprising, a transmitting distributor having a segmented ring comprised of an odd number of signal impulse segments, a tape sensing apparatus having a corresponding number of feeler levers each responsive to the perforations in a tape, a plurality of contactors for routing the application of current from different current sources in accordance with said feeler levers, and cam means operated in predetermined relationship to said transmitting distributor for actuating said contactors to reverse said current sources during consecutive cycles of transmission.

9. Auxiliary apparatus for association with a tape transmitting distributor having supervisory segments and code signal segments, said apparatus comprising a pair of cams rotated at one-half of the speed of said transmitting distributor, means controlled by one of said cams for determining the application of current potential to said supervisory segments, and means controlled by the other of said cams for supervising the application of current potential to said code segments.

10. Auxiliary apparatus for association with a tape transmitting distributor having start-stop elements and signal component elements, said apparatus comprising a pair of cams, means controlled by one of said cams for determining the application of current potential to said start-stop elements, and means controlled by the other of said cams for determining the application of current potential to said signal component elements.

11. An apparatus for controlling the nature of signal components of a tape transmitting distributor, comprising in combination with the start-stop regulated rotary commutator, a pair of supervisory cams, means for operating said cams at one-half the speed of operation of said commutator, a tape controlled sensing unit having contact elements, and circuit controlling apparatus supervised by said cams for periodically controlling the application of current potential to the contact elements of said unit and to the segments of said commutator.

12. In an apparatus for controlling the nature of signal components of a tape transmitting distributor, a pair of supervisory cams, means for operating said cams at one-half the speed of operation of said distributor, a tape controlled sensing unit, and switching apparatus supervised by said cams for alternately reversing the application of current potential to said unit and to said distributor.

13. In combination with a start-stop distributor, a plurality of sources of different current potential, a plurality of contactors for variously associating said sources of current potential with said distributor, and cam means operated in timed relation with said distributor for controlling said contactors variously during consecutive cycles of operation of said distributor.

14. In combination with a permutation code transmitter having a plurality of impulse elements, a distributor brush for traversing said elements during cyclic operation, and plural cam means for associating different current potentials with said elements at several instants during consecutive cycles of said brush, said cam means being effective to produce said association of certain potentials with certain elements at instants when said brush is communicating with other ones of said elements.

LOUIS M. POTTS.